Nov. 13, 1945.   V. S. HARRISON   2,388,966
ELECTRICAL STRAIN GAUGE
Filed May 13, 1944

Inventor
Verne S. Harrison
By Fred Gerlach
His Atty

Patented Nov. 13, 1945

2,388,966

UNITED STATES PATENT OFFICE 2,388,966

ELECTRICAL STRAIN GAUGE

Verne S. Harrison, San Diego, Calif., assignor to Consolidated Vultee Aircraft Corporation, San Diego, Calif., a corporation of Delaware Application May 13, 1944, Serial No. 535,493

10 Claims. (Cl. 201—63)

The invention relates to electric strain gauges for measuring dynamic or static forces of that type in which strain sensitive resistance wire is used to control an electric circuit for indicating or recording the forces applied to the gauge.

One object of the invention is to provide electric strain gauges of a construction which is sensitively responsive to light variations in the forces applied to the gauge.

Another object of the invention is to provide a low-cost efficient electric strain gauge.

Another object of the invention is to provide an electric strain gauge which is simple in construction, efficient in operation, and adapted for high production.

Other objects of the invention will appear from the detailed description.

The invention consists in the several novel features hereinafter set forth and more particularly defined by claims at the conclusion hereof.

Figure 1:
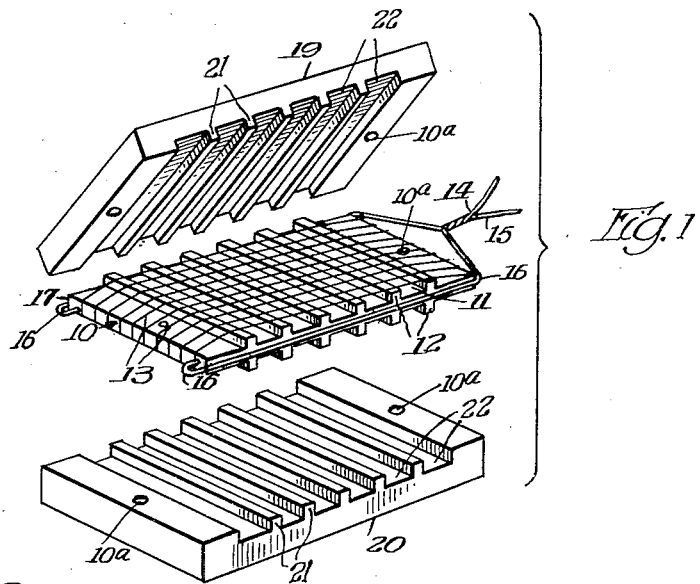
Fig. 1 is a perspective of the parts of the strain gauge separated for illustrative purposes.
Figures 2, 3:
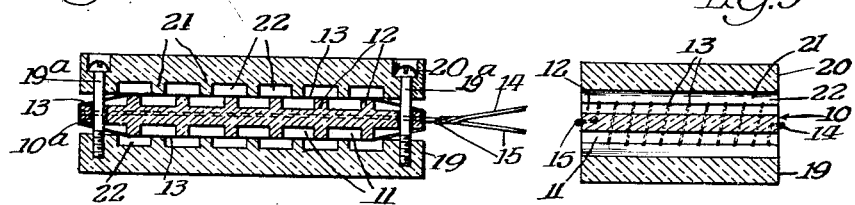
Fig. 2 is a longitudinal section of the strain gauge.
Fig. 3 is a transverse section.
Figure 4:
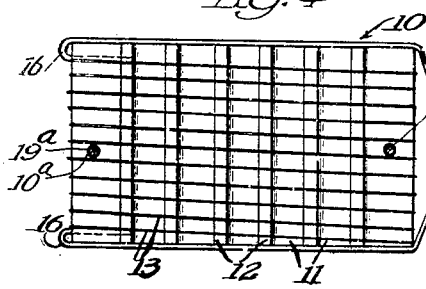
Fig. 4 is a plan of the strain gauge with one of the plates removed, and illustrating the strain sensitive resistance wire around the core or plate, and the lead conductors connected to said wire.

The strain gauge exemplifying the invention comprises a central plate-like core 10 which is substantially rectangular in plan-form and is formed of insulating material having a low coefficient of expansion so that it will not be affected by temperature changes. This core is provided on each of its opposite or top and bottom faces with a series of transversely extending parallel ribs 12 with transverse recesses or depressions 11 between them. A strip of fine strain sensitive wire 13, for example, .0015 inch in diameter, is helically wrapped or coiled around the cores, and its convolutions extend longitudinally of the core and transversely across the recesses and contact with the top and bottom faces of ribs 12. The wire 13 is normally under tension, and is unsupported or free to be deformed or deflected into the recesses 11. The portions of the convolutions of the resistance wire 13 which extend across the faces of ribs 12, are cemented to said faces so that they will remain in properly spaced apart relation. A pair of lead conductors 14 and 15 have their ends respectively secured in the core and the ends of resistance wire 13 at one end of the core are secured to the lead conductors, usually by soldering, as at 16 and 17. The lead wires extend around the sides of the core and are connected to an electrical circuit as hereinafter described.

A pair of pressure plates or elements 19 and 20, substantially rectangular in plan-form, are positioned in planes substantially parallel to the planes of the outer faces of the ribs 12 on the core, and are formed of insulating material having a low coefficient of expansion. Each of the plates 19 and 20 is provided with a series of transverse ribs 21 which are substantially parallel to the ribs 12 on the core and are separated by longitudinal recesses 22. The transverse ribs 21 are positioned midway between the ribs 12 on the core and centrally of the recesses 11. The faces of several of the ribs 21 are cemented to and contact a portion of the loops of the strain sensitive wire 13 midway between ribs 12, and thereby aid in retaining the convolutions of the wire 13 spaced apart transversely on plates 19 and 20. Screws 19a extend through the plate 20 and holes 10a in the core 10, and are secured in plate 20 for holding said plates and the core in assembled relation.

The assembled gauge is used where the forces to be measured are adapted to press the plates 19 and 20 together with the core between them. Such forces are applied through ribs 21, deform and stretch or deflect the strain sensitive resistance wire between the ribs 12 on the core for varying the resistance of the wire in the electric circuit. The recesses 11 in the core and the recesses in plates 19 and 20 permit deflection of the portions of the resistance wire by the ribs 21 on said plates. Each rib 21 is adapted, in response to force applied transversely to the plates 19 and 20, to deflect and stretch an entire row of the convolutions of the wire between a pair of ribs 12 on the core plate and collectively the ribs 21 produce a great multiplicity of deformations which render the gauge extremely sensitive and accurately responsive to forces of minutely varying magnitudes.

The tension in the convolutions of wire wound around the core, the number of convolutions, the gauge of the wire, and the spacing of the ribs are factors which determine the sensitivity of the strain gauge. The greater the spacing between the ribs the more sensitive they are to the applied forces, but with widely spaced ribs resonance arises and variations in wire tension may result. In the gauge illustrated, the spacing between the ribs is proportioned to eliminate resonance and to permit easy duplication with uniform tension.

The plate members 19 and 20 and the core 10 are formed of suitable insulation material having a low coefficient of expansion which is not responsive to temperature changes and may be cast of suitable plastic into the desired shapes.

In the operation of the gauge, the forces applied to press the plates 10 and 20 together cause each of the ribs 21 on said plates to deform or deflect transversely each of the entire series of windings between the ribs 12 on the core 10. As a result, the great multiplicity of transverse deflections of the wire in the gauge is extremely accurate and sensitive in measuring forces of slightly varying magnitudes, and varying the electric current passing to the recording or indicating instruments. The device is simple in construction and is readily applicable for many uses.

Figure 5:
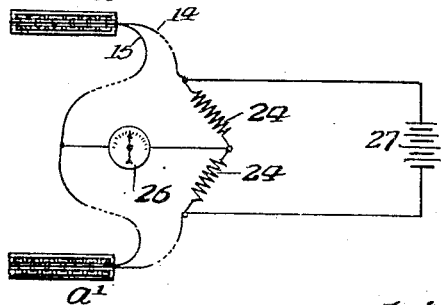
Fig. 5 is a diagram of an electrical circuit for the electric strain gauge with an indicating device for the current changes produced by the gauge.

Fig. 5 illustrates an electric circuit including legs 24 of an electric circuit including legs 24 of a Wheatstone bridge, a battery 27 and a galvanometer 26 which exemplies an indicating or recording instrument which is responsive to variations in the current controlled by the strain gauge and the varying forces applied thereto. One of the strain gauges, generally designated a, is used to measure the static forces and is included with one leg of the bridge. A second strain gauge, generally designated a', of the same construction, provides a second leg for the bridge and serves as a temperature compensating device for maintaining accuracy in the readings. The resistances 24 form the legs of the Wheatstone bridge and are equal to each other and to the determined resistances of the strain gauge. Any change occurring in the value of the resistance of the strain gauge a will throw the Wheatstone bridge out of balance and the changes responsive to the forces applied will be recorded by the galvanometer 26. When it is desired to record dynamic forces, an oscillograph is substituted for the galvanometer 26.

Figure 6:
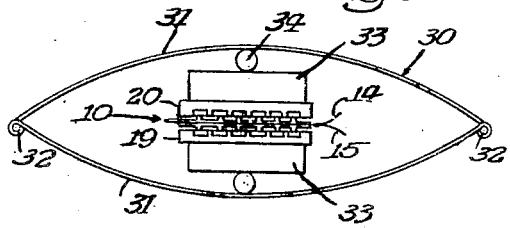
Fig. 6 is a side elevation illustrating the strain gauge as used to measure forces applied to an elliptical spring.

In Fig. 6, the invention is exemplified as used for measuring the forces in tension or compression on an elliptical spring 30 which is composed of upper and lower curved leaves 31 which are pivotally connected at their outer ends by pivots 32. Blocks 33 are interposed between the plates 19 and 20 and contact members 34 between the blocks 33 and the leaves of the spring so that compression or tension forces applied to the spring will press the plates together to deform the windings around the core of the resistance wire.

The invention exemplifies an electric strain gauge which is simple in construction, sensitive in its operation, and responsive to forces of slightly varying magnitudes.

The invention is not to be understood as restricted to the details set forth, since these may be modified within the scope of the appended claims without departing from the spirit and scope of the invention.

Having thus described the invention, what I claim as new and desire to secure by Letters Patent is:

1. An electric strain gauge comprising a core of insulating material provided on both faces with ribs and recesses between the ribs, a strain sensitive resistance wire wound around the core and having its convolutions supported by the ribs on the core and deflectable in the recesses between said ribs, and plates of insulating material extending over the convolutions of the resistance wire on the faces of the core, respectively, and provided with ribs for deflecting the wire at the recesses between the ribs on the core, responsively to forces applied to press the core and plates together.

2. An electric strain gauge comprising a core of insulating material provided on one of its faces with ribs and recesses between the ribs, a strain sensitive resistance wire wound around the core and having its convolutions supported by the ribs on the core and deflectable in the recesses between said ribs, and a plate of insulating material extending over the convolutions of the resistance wire and provided with ribs for deflecting the wire at the recesses between the ribs on the core, responsively to forces applied to press the core and plate together.

3. An electric strain gauge comprising, a plate-like core of insulating material provided on one of its faces with ribs spaced apart, a strain sensitive resistance wire laid over the ribs and extending across the spaces therebetween and having portions deflectable between said ribs, and a plate of insulating material extending over the resistance wire and provided with ribs for deflecting the wire at the spaces between the ribs on the core, responsively to forces applied to press the plates together.

4. An electric strain gauge comprising, a plate-like core of insulating material provided on its opposite faces with ribs spaced apart, a strain sensitive resistance wire coiled around the ribs on the core and extending across the spaces therebetween and having portions deflectable between said ribs and plates of insulating material extending over the convolutions of the resistance wire and provided with ribs for deflecting the wire at the spaces between the ribs on the core, responsively to forces applied to press the plates together.

5. An electric strain gauge comprising, a plate-like core of insulating material provided on one of its faces with ribs spaced apart, a strain sensitive resistance wire coiled around and cemented to the ribs on the core, and portions tensioned across and deflectable between said ribs, and a plate of insulating material extending over the convolutions of the resistance wire and provided with ribs cemented to and for deflecting the wire at the spaces between the ribs on the core, responsively to forces applied to press the plates together.

6. An electric strain gauge comprising, a plate-like core of insulating material provided on its opposite faces with ribs spaced apart, a strain sensitive resistance wire coiled around and cemented to the ribs on the core and the spaces between said ribs, and having portions tensioned across and deflectable between said ribs, and plates of insulating material extending over the resistance wire on opposite sides of the core and provided with ribs cemented to and for deflecting the wire at the spaces between the ribs on the core, responsively to forces applied to press the plates together.

7. An electric strain gauge, comprising: a strain-sensitive resistance wire, a core of insulating material provided with means on which a plurality of lengths of the wire are supported at a series of points spaced apart, with portions of the wire between said points free to be deflected into the spaces between said points, and a member of insulating material movably connected to the core extending over the resistance wire and provided with means for deflecting portions of said lengths of wire into the spaces between said points, responsively to force applied to press the core and member together.

8. An electric strain gauge, comprising: a strain-sensitive resistance wire, a core of insulating material provided on its opposite faces with means on which a plurality of length of wire are supported at a series of points spaced apart, with portions of the wire between said points free to be deflected into the spaces between said points, and members of insulating material on opposite sides of and movably connected to the core, extending over the resistance wire and provided with means for deflecting the lengths of wire between said supported points into the series of spaces between said points, responsively to force applied to press the core and members together.

9. An electric strain gauge, comprising: a strain-sensitive resistance wire, a core of insulating material provided with ribs on which a plurality of lengths of the wire are supported at a series of points spaced apart, with portions of the wire between said ribs free to be deflected into the spaces between said points, and a member of insulating material movably connected to the core and extending over the resistance wire and provided with ribs for deflecting the wire into the series of spaces between the ribs on the core, responsively to force applied to press the core and member together.

10. An electric strain gauge, comprising: a strain-sensitive resistance wire, a core of insulating material provided on opposite faces with ribs for supporting the wire at a series of points spaced apart, with portions of the wire between said points free to be deflected into the spaces between the points, and a member of insulating material movably connected to the core and extending over the resistance wire and provided with ribs for deflecting the wire into the series of spaces between the ribs on the core, responsively to force applied to press the core and member together.

VERNE S. HARRISON.